(12) United States Patent
Cao

(10) Patent No.: US 9,370,065 B2
(45) Date of Patent: Jun. 14, 2016

(54) SHORT-CIRCUIT PROTECTION CIRCUIT AND ELECTRONIC DEVICE

(71) Applicant: SHENZHEN CHINA STAR OPTOELECTRONICS TECHNOLOGY CO., LTD., Shenzhen, Guangdong (CN)

(72) Inventor: Dan Cao, Guangdong (CN)

(*) Notice: Subject to any disclaimer, the term of this patent is extended or adjusted under 35 U.S.C. 154(b) by 0 days.

(21) Appl. No.: 13/983,766

(22) PCT Filed: Jun. 30, 2013

(86) PCT No.: PCT/CN2013/078531
§ 371 (c)(1),
(2) Date: Aug. 5, 2013

(87) PCT Pub. No.: WO2014/187018
PCT Pub. Date: Nov. 27, 2014

(65) Prior Publication Data
US 2016/0088695 A1    Mar. 24, 2016

(30) Foreign Application Priority Data
May 24, 2013 (CN) .......................... 2013 1 0199032

(51) Int. Cl.
H05B 37/02 (2006.01)
H05B 33/08 (2006.01)
(52) U.S. Cl.
CPC .......... *H05B 33/0827* (2013.01); *H05B 33/089* (2013.01); *H05B 33/0851* (2013.01); *H05B 33/0887* (2013.01); *Y02B 20/341* (2013.01)

(58) Field of Classification Search
USPC ........... 315/185 R, 209 R, 291, 299, 307, 308
See application file for complete search history.

(56) References Cited

U.S. PATENT DOCUMENTS

| | | | |
|---|---|---|---|
| 8,203,288 B2* | 6/2012 | Lee | H05B 33/0818 315/209 R |
| 8,830,702 B2* | 9/2014 | Macfarlane | H02M 1/4225 363/16 |
| 2010/0013412 A1* | 1/2010 | Archibald | H05B 33/0827 315/294 |

\* cited by examiner

*Primary Examiner* — Thuy Vinh Tran

(57) ABSTRACT

A short-circuit protection circuit to execute a short-circuit protection for a LED module of an electronic device. The LED module includes a positive input port. the short-circuit protection circuit includes a control unit for controlling the LED module to work or do not work, a feedback module, a comparison module, and a trigger module. The feedback module is connected between the positive input port of the LED module and ground, and is used to detect a voltage of the positive input port and produce a feedback voltage proportional to the voltage of the positive input port. The comparison module produces a first comparison signal when comparing the feedback voltage is less than a reference voltage. The trigger module produces an off trigger signal to trigger the control unit to control the LED module to not work, when receiving the first comparison signal.

17 Claims, 1 Drawing Sheet

SHORT-CIRCUIT PROTECTION CIRCUIT AND ELECTRONIC DEVICE

FIELD OF THE INVENTION

The present invention relates to a protection circuit, and more particularly, to a short-circuit protection circuit and an electronic device with the same.

BACKGROUND OF THE INVENTION

Nowadays, more and more electronic devices use light-emitting diodes (LEDs) as backlight module. For a common LED backlight module, these LED strings of the LED module are turned on or off under controlling of a control integrated chip (IC), and the control integrated chip and the LED strings are powered by a power source. Usually, when two ends of the LED strings are short-circuited, namely an output of the power source is short-circuited, it is easy to damage the IC. However, general circuits do not have short-circuit protection function for the LED strings.

SUMMARY OF THE INVENTION

The present invention provides an electronic device and a short-circuit protection circuit, which capable of executing short-circuit protection for a LED module of the electronic device.

An electronic device comprises a power source, a LED module, and a short-circuit protection circuit; wherein, the LED module comprises a positive input port and a controlled port. The power source comprises an output port. The short-circuit protection circuit comprises a control unit, a feedback module, a comparison module, and a trigger module. the control unit comprises a power port, a control port, and a trigger port. The output port of the power source is connected to the positive input port of the LED module and the power port of the control unit, and is used to provide power to the LED module and the control unit via the output port; the control port of the control unit is connected to the controlled port of the LED module, the control unit is used to control the LED module to work or do not work. Therein, the feedback module is connected between the positive input port of the LED module and ground, and is used to detect a voltage of the positive input port and produce a feedback voltage proportional to the voltage of the positive input port. The comparison module is connected to the feedback module, and is used to compare the feedback voltage with a reference voltage and produce a first comparison signal when comparing the feedback voltage is less than the reference voltage. The trigger module is connected to the comparison module and the trigger port of the control unit, and is used to produce an off trigger signal to the trigger port of the control unit to trigger the control unit to control the LED module to not work, when the trigger module receives the first comparison signal output by the comparison module.

Therein, the comparison module is further configured to produce a second comparison signal when comparing the feedback voltage is greater than or equal to the reference voltage, the trigger module is further configured to produce an on trigger signal to trigger the control unit to control the LED module to work, when receiving a first comparison signal output by the comparison module.

Therein, the feedback voltage produced by the feedback module is proportional to the voltage of the positive input port; when two ends of the LED module is short-circuited, the voltage of the positive input port is decreased, thus causing the feedback voltage is decreased too and less than the reference voltage, the comparison module then produces the first comparison signal when comparing the feedback voltage is less than the reference voltage; the trigger module produces the off trigger signal to trigger the control unit to control the LED module to not work accordingly.

Therein, the LED module comprises a number of LED strings connected between the positive input port and ground in parallel, each LED string comprise several light-emitting diodes (LEDs) and a first N-channel metal oxide semiconductor field effect transistor (NMOS FET) which are connected in series; the LEDs are connected between the positive input port and a drain of the NMOS FET, a source of the first NMOS FET is grounded, a gate of the NMOS FET constitutes the controlled port.

Therein, the feedback module comprises a first resistor and a second resistor which are connected between the positive input port and ground in series; a connection node of the first resistor and the second resistor constitutes a feedback terminal; the voltage of the positive input port is divided by the first resistor and the second resistor and forms a voltage of the feedback terminal, the voltage of the feedback terminal is the detection voltage produced by the feedback detection module.

Therein, the comparison module comprises an operational amplifier, the operational amplifier comprises an non-inverting input port, an inverting input port, and an output port, the non-inverting input port is connected to the reference voltage, the inverting input port is connected to the feedback terminal of the feedback module; the trigger module comprises a third resistor, a fourth resistor, and a second NMOS FET, the third resistor and the fourth resistor are connected between a voltage port and ground in series; a connection node of the third resistor and the fourth resistor is connected to a drain of the second NMOS FET and the trigger port of the control unit, a source of the second NMOS FET is grounded, a gate of the second NMOS FET is connected to the output port of the operational amplifier.

Therein, each LED string of the LED module further comprises a fifth resistor connected between the first NMOS FET and the ground; the control unit further comprises a plurality of signal pins, ends of the fifth resistors of these LED strings far away from the ground are connected to the signal pins one by one; the signal pins are configured to detect current flowing though the LED strings.

Therein, the control unit further comprises a feedback pin connected to the feedback terminal of the feedback module and a gate pin, the short-circuit protection circuit further comprises a third NMOS FET, a drain of the third NMOS FET is electrically connected to the voltage port, a source of the third NMOS FET is grounded via a sixth resistor, a gate of the third NMOS FET connected to the gate pin; the control unit is further configured to output a pulse width modulation (PWM) signal to control the third NMOS FET to turn on or off via the gate pin, and then convert the voltage output by the output port of the power source to a switching power source signal to power the LED module; wherein the control unit adjusts a duty cycle of the PWM signal output by the gate pin according to the feedback voltage received by the feedback pin, thus changing the switching power source signal output to the LED module.

Therein, the electronic device is one selected from the group consist with a television, a display, a mobile phone, and a tablet computer.

A short-circuit protection circuit is used to execute a short-circuit protection for a LED module of an electronic device. The LED module of the electronic device comprises a positive input port and a controlled port. The short-circuit protection circuit comprises a control unit, a trigger port, a feedback module, comparison module, and a trigger module. The control unit comprises a control port and a trigger port, the control port is connected to the controlled port of the LED module, the control unit is used to control the LED module to work or do not work. Therein, the feedback module is connected between the positive input port of the LED module and ground, and is used to detect a voltage of the positive input port and produce a feedback voltage proportional to the voltage of the positive input port. The comparison module is connected to the feedback module, and is used to compare the feedback voltage with a reference voltage and produce a first comparison signal when comparing the feedback voltage is less than the reference voltage. The trigger module is connected to the comparison module and the trigger port of the control unit, and is used to produce an off trigger signal to the trigger port of the control unit to trigger the control unit to control the LED module to not work, when the trigger module receives the first comparison signal output by the comparison module.

Therein, the comparison module is further configured to produce a second comparison signal when comparing the feedback voltage is greater than or equal to the reference voltage, the trigger module is further configured to produce an on trigger signal to trigger the control unit to control the LED module to work, when receiving a first comparison signal output by the comparison module.

Therein, the feedback voltage produced by the feedback module is proportional to the voltage of the positive input port; when two ends of the LED module is short-circuited, the voltage of the positive input port is decreased, thus causing the feedback voltage is decreased too and less than the reference voltage, the comparison module then produces the first comparison signal when comparing the feedback voltage is less than the reference voltage; the trigger module produces the off trigger signal to trigger the control unit to control the LED module to not work accordingly.

Therein, the LED module comprises a number of LED strings connected between the positive input port and ground in parallel, each LED string comprise several light-emitting diodes (LEDs) and a first N-channel metal oxide semiconductor field effect transistor (NMOS FET) which are connected in series; the LEDs are connected between the positive input port and a drain of the NMOS FET, a source of the first NMOS FET is grounded, a gate of the NMOS FET constitutes the controlled port.

Therein, the feedback module comprises a first resistor and a second resistor which are connected between the positive input port and ground in series; a connection node of the first resistor and the second resistor constitutes a feedback terminal; the voltage of the positive input port is divided by the first resistor and the second resistor and forms a voltage of the feedback terminal, the voltage of the feedback terminal is the detection voltage produced by the feedback detection module.

Therein, the comparison module comprises an operational amplifier, the operational amplifier comprises an non-inverting input port, an inverting input port, and an output port, the non-inverting input port is connected to the reference voltage, the inverting input port is connected to the feedback terminal of the feedback module; the trigger module comprises a third resistor, a fourth resistor, and a second NMOS FET, the third resistor and the fourth resistor are connected between a voltage port and ground in series; a connection node of the third resistor and the fourth resistor is connected to a drain of the second NMOS FET and the trigger port of the control unit, a source of the second NMOS FET is grounded, a gate of the second NMOS FET is connected to the output port of the operational amplifier.

Therein, each LED string of the LED module further comprises a fifth resistor connected between the first NMOS FET and the ground; the control unit further comprises a plurality of signal pins, ends of the fifth resistors of these LED strings far away from the ground are connected to the signal pins one by one; the signal pins are configured to detect current flowing though the LED strings.

Therein, the control unit further comprises a feedback pin connected to the feedback terminal of the feedback module and a gate pin, the short-circuit protection circuit further comprises a third NMOS FET, a drain of the third NMOS FET is electrically connected to the voltage port, a source of the third NMOS FET is grounded via a sixth resistor, a gate of the third NMOS FET connected to the gate pin; the control unit is further configured to output a pulse width modulation (PWM) signal to control the third NMOS FET to turn on or off via the gate pin, and then convert the voltage output by the output port of the power source to a switching power source signal to power the LED module; wherein the control unit adjusts a duty cycle of the PWM signal output by the gate pin according to the feedback voltage received by the feedback pin, thus changing the switching power source signal output to the LED module.

The electronic device and the short-circuit protection circuit of the present invention capable of executing short-circuit protection for a LED module of the electronic device when the two ends of the LED module are short circuited, which prevent the control unit to be damaged.

DETAILED DESCRIPTION OF THE PREFERRED EMBODIMENTS

Figure 1:
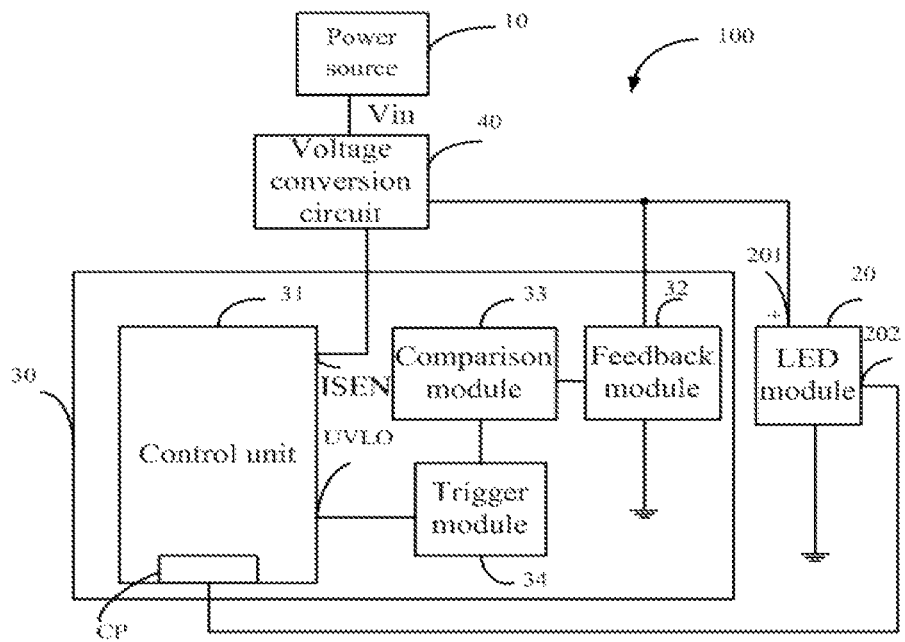
FIG. 1 illustrates a block diagram of an electronic device with a short-circuit protection circuit, in according to an example embodiment.

Referring to FIG. 1, an electronic device 100 with a short-circuit protection circuit 30 is provided. The electronic device 100 includes a power source 10, a LED module 20, and the over-protection circuit 30.

The LED module 20 includes a positive input port 201 and a controlled port 202, the control unit 31 includes a power port ISEN, a control port CP and a trigger port ULVO.

The power source 10 includes an output port Vin, the output port Vin is connected to the positive input port 201 of the LED module 20 and the power port ISEN of the control unit 21. The power source 10 provides power to the LED module 20 and the control unit 31 via the output port Vin. The power source 10 can be a battery or a power adapter.

The over-voltage protection circuit 30 includes the control unit 31, a feedback module 32, a comparison module 33, and a trigger module 34. The control port CP of the control unit 31 is connected to the controlled port 202 of the LED module 20, the control unit 31 is used to enable the LED module 20 to work or disable the LED module 20 to not work. Namely, the control unit 31 is used to turn on the LED module 20 or turn off the LED module 20.

The feedback module 32 is connected between the positive input port 201 of the LED module 20 and ground, and is used to detect a voltage of the positive input port 201 and produce a feedback voltage proportional to the voltage of the positive input port 201.

The comparison module 33 is connected to the feedback module 32 and the trigger module 34, and is used to compare the feedback voltage with a reference voltage Vref and produce a first comparison signal when comparing the feedback voltage is less than the reference voltage Vref.

The trigger module 34 is also connected to the trigger port ULVO, the trigger module 34 is used to produce an off trigger signal to the trigger port ULVO of the control unit 31 to trigger the control unit 31 to control the LED module 20 to not work, when receiving the first comparison signal output by the comparison module 33.

The comparison module 33 also produces a second comparison signal when comparing the feedback voltage is greater than or equal to the reference voltage Vref. The trigger module 34 is also used to produce an on trigger signal to trigger the control unit 31 to control the LED module 20 to work, when receiving a first comparison signal output by the comparison module 33.

In the embodiment, the feedback voltage produced by the feedback module 32 is proportional to the voltage of the positive input port 201. Therefore, when the two ends of the LED module 20 is short-circuited, the voltage of the positive input port 201 is decreased, thus causing the feedback voltage is decreased too and less than the reference voltage Vref. The comparison module 33 produces the first comparison signal when comparing the feedback voltage is less than the reference voltage Vref. The trigger module 34 produces the off trigger signal to trigger the control unit 31 to control the LED module 20 to not work. Thus achieving short-circuit protection function.

In the embodiment, the electronic device 100 also includes a voltage conversion circuit 40. The voltage conversion circuit 40 is used to convert the voltage output by the power source 10 to a suitable voltage to power the LED module 20 and the control unit 31. In another embodiment, the voltage conversion circuit 40 can be omitted, the voltage output by the power source 10 powers the LED module 20 and the control unit 31 directly. In further another embodiment, the power source 10 includes voltage conversion function, and can output suitable voltage.

In the embodiment, the electronic device 100 can be a television, a display, a mobile phone, and a tablet computer.

Figure 2:
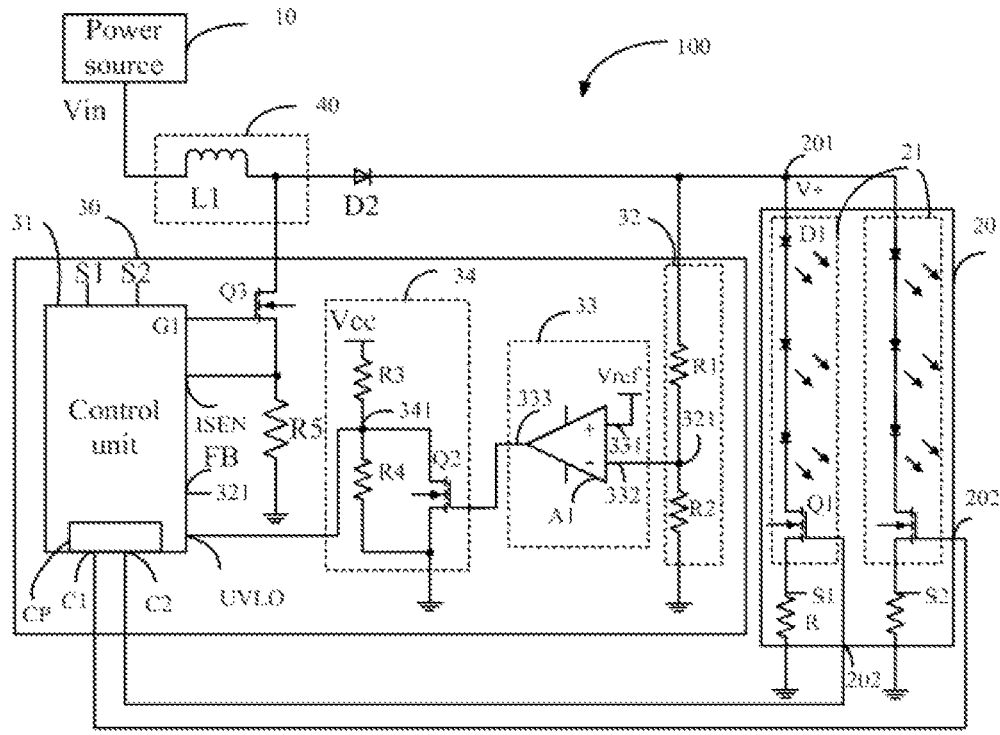
FIG. 2 illustrates a circuit diagram of the electronic device with a short-circuit protection circuit of FIG. 1.

Referring to FIG. 2, in the embodiment, the LED module 20 includes a number of LED strings 21 connected between the positive input port 201 and the ground in parallel. Each LED string includes several light-emitting diodes (LEDs) D1 and an N-channel metal oxide semiconductor field effect transistor (NMOS FET) Q1 which are connected in series. Therein, the LEDs D1 are connected between the positive input port 201 and a drain of the NMOS FET Q1. A source of the NMOS FET Q1 is grounded, a gate of the NMOS FET Q1 constitutes the controlled port 202.

The feedback module 32 includes a first resistor R1 and a second resistor R2 which are connected between the positive input port 201 and the ground in series. A connection node of the first resistor R1 and the second resistor R2 constitutes a feedback terminal 321. The voltage of the positive input port 201 is divided by the first resistor R1 and the second resistor R2 and forms a voltage of the feedback terminal 321, the voltage of the feedback terminal 321 is the detection voltage produced by the feedback detection module 32. In detail, assume the voltage of the positive input port 201 is V+, the feedback voltage is $R2*V+/(R1+R2)$.

The comparison module 33 includes an operational amplifier A1, the operational amplifier A1 includes a non-inverting input port 331, an inverting input port 332, and an output port 333. The non-inverting input port 331 is connected to the reference voltage Vref, the inverting input port 332 is connected to the feedback terminal 321 of the feedback module 33.

The trigger module 34 includes a third resistor R3, a fourth resistor R4, and a NMOS FET Q2. The third resistor R3 and the fourth resistor R4 are connected between a voltage port Vcc and ground in series. A connection node 341 of the third resistor R3 and the fourth resistor R4 is connected to a drain of the NMOS FET Q2 and the trigger port ULVO of the control unit 31. A source of the NMOS FET Q2 is grounded, a gate of the NMOS FET Q2 is connected to the output port 333 of the operational amplifier A1. The voltage port Vcc can obtains voltage from the power source and at a high voltage, such as 5 volts.

The control port CP of the control unit 31 includes a number of control pins C1, C2. The control pins C1, C2 are respectively connected to gates of the NMOS FETs Q1 of the LED strings. The number of the control pins C1, C2 is equal to that of the LED strings.

In the embodiment, the resistance values of the first resistor R1 and the second resistor R2 are set previously. The resistance values of the first resistor R1 and the second resistor R2 are set to make the feedback voltage is greater than the reference voltage Vref when the electronic device 100 is worked normally, and make the feedback voltage is less than the reference voltage Vref when the LED module 20 is short-circuited.

In detail, assume the reference voltage Vref is 0.5 volt, the resistance value of the first resistor R1 is 100 ohm, and the resistance value of the second resistor R2 is 10 ohm.

Usually, when the electronic device 100 is worked normally, the voltage V+ of the positive input port 201 is greater than 40 volts. When the two ends of the LED module 20 are short-circuited, the voltage V+ of the positive input port 201 is less than 4 volts. Therefore, when the electronic device 100 is worked normally, the feedback voltage is $R2*V+/(R1+R2)=V+/11$. Because the voltage V+ of the positive input port is greater than 40 volts now, then the feedback voltage is greater than 40/11 and greater than 0.5 volt, namely is greater than the reference voltage Vref. When the LED module 20 is short-circuited, because the voltage V+ of the positive input port is less than 4 volts, then the feedback voltage is less than 4/11 and less than 0.5 volt, namely is less than the reference voltage Vref.

In the embodiment, the first comparison signal is a high voltage signal, and the second comparison signal is a low voltage signal. The off trigger signal is the low voltage signal, and the on trigger signal is the high voltage signal.

When the two ends of the LED module 20 are short-circuited, the feedback voltage is less than the reference voltage Vref. The comparison module outputs the high voltage signal to the gate of the NMOS FET Q2 via the output port 333 when comparing the feedback voltage is less than the reference voltage Vref. The NMOS FET Q2 is turned on accordingly, the trigger port ULVO is grounded via the NMOS FET Q2 which is turned on and obtains the low voltage signal. Therefore, the control unit 31 turns off the LED module when the trigger port ULVO receives the off trigger signal with the low voltage. In detail, the control unit 31 respectively outputs the low voltage signal to the gate of the NMOS FETs Q1 of these LED string 21 via the control pins C1, C2 to turn off the NMOS FETs Q1 of these LED string 21. Therefore, the LED module 20 does not at work state.

When the electronic device is worked normally, the feedback voltage is greater than the reference voltage Vref. The comparison module outputs the low voltage signal to the gate of the NMOS FET Q2 via the output port 333 when comparing the feedback voltage is greater than the reference voltage Vref. The NMOS FET Q2 is turned off accordingly, the trigger port ULVO is connected to the voltage port Vcc via the third resistor R3 and obtains the on trigger signal with the high voltage. Therefore, the control unit 31 turns on the LED module 20 when the trigger port ULVO receives the on trigger signal with the high voltage. In detail, the control unit 31 respectively outputs the high voltage signal to the gate of the NMOS FETs Q1 of these LED string 21 via the control pins C1, C2 to turn on the NMOS FETs Q1 of these LED string 21. Therefore, the LED module 20 at work state accordingly. In another embodiment, the control unit 31 turns on the LED module 20 by outputting pulse signals to the gate of the gate of the NMOS FETs Q1 of these LED strings 21 to control the NMOS FETs Q1 to turn on or off alternately. Thus these LED strings 21 are worked in a switching power source mode.

Therefore, when the two ends of the LED module 20 is short-circuited, the short-circuit protection circuit 30 can protect the LED module 20 quickly by cutting off the loop of the LED module 20.

In the embodiment, the voltage conversion circuit 40 includes a transformer winding L1, the transformer winding L1 converts a voltage output by the power source 10 to a suitable voltage and provides the suitable voltage to the LED module 20. As shown in FIG. 2, the electronic device 100 also includes a diode D2, the diode D2 is connected between the transformer winding L1 and the positive input port V+, and is used to prevent the reverse current.

In the embodiment, each LED string 21 of the LED module 20 also includes a resistor R connected between the NMOS FET Q1 and the ground. The control unit 10 also includes a number of signal pins S1~S2. Ends of the resistors R of these LED strings 21 far away from the ground are connected to the signal pins S1~S2 one by one. Therein, the number of the signal pins S1~S2 is equal to the number of the LED strings 21. Obviously, the number of the signal pins S1~S2 is changed follows the change of the number of the LED strings 21. The signal pins S1~S2 are used to detect the current flowing though the LED strings 21, the detected current are provided to the control unit 10 for further controlling.

In the embodiment, the control unit 31 also includes a feedback pin FB, the feedback pin FB is connected to the feedback terminal 321 of the feedback module 32. The control unit 31 controls the voltage output to the LED module 20 according to the feedback voltage received by the feedback pin FB.

In detail, the control unit 31 also includes a gate pin G1, the short-circuit protection circuit 30 also includes a NMOS FET Q3. A drain of the NMOS FET Q3 is electrically connected to the voltage port, a source of the NMOS FET Q3 is grounded via a resistor R5, a gate of the NMOS FET Q3 is connected to the gate pin G1. The control unit 31 outputs a pulse width modulation (PWM) signal to control the NMOS FET Q3 to turn on or off via the gate pin G1, and then convert the voltage output by the output port Vin of the power source 10 to switching power source signal to power the LED module 20. The control unit 31 adjusts a duty cycle of the PWM signal output by the gate pin G1 according to the feedback voltage received by the feedback pin FB, thus changing the switching power source signal, namely changing the voltage output to the LED module 20. In the embodiment, the power port ISEN is electrically connected to the output port Vin of the power source 10 via the NMOS FET Q1, and receives the voltage output by the power source 10 via the NMOS FET Q1. In another embodiment, the power port ISEN is connected to the power source 10 directly.

The NMOS FETs Q1~Q3 can be instead by negative-positive-negative bipolar junction transistors. In another embodiment, the NMOS FET Q1~Q3 also can be instead by P-channel metal oxide semiconductor field effect transistors or positive-negative-positive bipolar junction transistors. Therein, the short-circuit protection circuit 30 also includes other elements, because these elements are unrelated to the present invention, the description about these elements are omitted.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. An electronic device comprising:
   a power source;
   a LED module; and
   a short-circuit protection circuit;
   wherein, the LED module comprises a positive input port and a controlled port; the power source comprises an output port; the short-circuit protection circuit comprises a control unit, the control unit comprises a power port and a control port; the output port of the power source is connected to the positive input port of the LED module and the power port of the control unit, and configured to provide power to the LED module and the control unit via the output port; the control port of the control unit is connected to the controlled port of the LED module, the control unit is configured to control the LED module to work or do not work;
   wherein, the control unit further comprises a trigger port, the short-circuit protection circuit further comprises:
   a feedback module connected between the positive input port of the LED module and ground, configured to detect a voltage of the positive input port and produce a feedback voltage proportional to the voltage of the positive input port;
   a comparison module connected to the feedback module, configured to compare the feedback voltage with a reference voltage and produce a first comparison signal when the feedback voltage is less than the reference voltage; and
   a trigger module connected to the comparison module and the trigger port of the control unit, configured to produce an off trigger signal to the trigger port of the control unit to trigger the control unit to control the LED module to not work, when the trigger module receives the first comparison signal output by the comparison module.

2. The electronic device of claim 1, wherein the comparison module is further configured to produce a second comparison signal when the feedback voltage is greater than or equal to the reference voltage, the trigger module is further configured to produce an on trigger signal to trigger the control unit to control the LED module to work, when receiving a first comparison signal output by the comparison module.

3. The electronic device of claim 1, wherein feedback voltage produced by the feedback module is proportional to the voltage of the positive input port; when two ends of the LED module is short-circuited, the voltage of the positive input port is decreased, thus causing the feedback voltage is decreased too and less than the reference voltage, the comparison module then produces the first comparison signal when the feedback voltage is less than the reference voltage; the trigger module produces the off trigger signal to trigger the control unit to control the LED module to not work accordingly.

4. The electronic device of claim 3, wherein the LED module further comprises a number of LED strings connected between the positive input port and ground in parallel, each LED string comprises several light-emitting diodes (LEDs) and a first N-channel metal oxide semiconductor field effect transistor (NMOS FET) which are connected in series; the LEDs are connected between the positive input port and a drain of the NMOS FET, a source of the first NMOS FET is grounded, a gate of the NMOS FET constitutes the controlled port.

5. The electronic device of claim 4, wherein the feedback module comprises a first resistor and a second resistor which are connected between the positive input port and ground in series; a connection node of the first resistor and the second resistor constitutes a feedback terminal; the voltage of the positive input port is divided by the first resistor and the second resistor and forms a voltage of the feedback terminal, the voltage of the feedback terminal is the detection voltage produced by the feedback detection module.

6. The electronic device of claim 5, wherein the comparison module comprises an operational amplifier, the operational amplifier comprises an non-inverting input port, an inverting input port, and an output port, the non-inverting input port is connected to the reference voltage, the inverting input port is connected to the feedback terminal of the feedback module; the trigger module comprises a third resistor, a fourth resistor, and a second NMOS FET, the third resistor and the fourth resistor are connected between a voltage port and ground in series; a connection node of the third resistor and the fourth resistor is connected to a drain of the second NMOS FET and the trigger port of the control unit, a source of the second NMOS FET is grounded, a gate of the second NMOS FET is connected to the output port of the operational amplifier.

7. The electronic device of claim 4, wherein each LED string of the LED module further comprises a fifth resistor connected between the first NMOS FET and the ground; the control unit further comprises a plurality of signal pins, ends of the fifth resistors of these LED strings far away from the ground are connected to the signal pins one by one; the signal pins are configured to detect current flowing though the LED strings.

8. The electronic device of claim 4, wherein the control unit further comprises a feedback pin connected to the feedback terminal of the feedback module and a gate pin, the short-circuit protection circuit further comprises a third NMOS FET, a drain of the third NMOS FET is electrically connected to the voltage port, a source of the third NMOS FET is grounded via a sixth resistor, a gate of the third NMOS FET connected to the gate pin; the control unit is further configured to output a pulse width modulation (PWM) signal to control the third NMOS FET to turn on or off via the gate pin, and then convert the voltage output by the output port of the power source to a switching power source signal to power the LED module; wherein the control unit adjusts a duty cycle of the PWM signal output by the gate pin according to the feedback voltage received by the feedback pin, thus changing the switching power source signal output to the LED module.

9. The electronic device of claim 1, wherein the electronic device is one selected from the group consist with a television, a display, a mobile phone, and a tablet computer.

10. A short-circuit protection circuit, configured to execute a short-circuit protection for a LED module of an electronic device, the LED module of the electronic device comprises a positive input port and a controlled port; the short-circuit protection circuit comprises a control unit comprising a control port, the control port is connected to the controlled port of the LED module, the control unit is configured to control the LED module to work or do not work; wherein, the control unit further comprises a trigger port, the short-circuit protection circuit further comprises:
a feedback module connected between the positive input port of the LED module and ground, configured to detect a voltage of the positive input port and produce a feedback voltage proportional to the voltage of the positive input port;
a comparison module connected to the feedback module, configured to compare the feedback voltage with a reference voltage and produce a first comparison signal when the feedback voltage is less than the reference voltage; and
a trigger module connected to the comparison module and the trigger port of the control unit, configured to produce an off trigger signal to the trigger port of the control unit to trigger the control unit to control the LED module to not work, when the trigger module receives the first comparison signal output by the comparison module.

11. The short-circuit protection circuit of claim 10, wherein the comparison module is further configured to produce a second comparison signal when the feedback voltage is greater than or equal to the reference voltage, the trigger module is further configured to produce an on trigger signal to trigger the control unit to control the LED module to work, when receiving a first comparison signal output by the comparison module.

12. The short-circuit protection circuit of claim 10, wherein the feedback voltage produced by the feedback module is proportional to the voltage of the positive input port; when two ends of the LED module is short-circuited, the voltage of the positive input port is decreased, thus causing the feedback voltage is decreased too and less than the reference voltage, the comparison module then produces the first comparison signal when the feedback voltage is less than the reference voltage; the trigger module produces the off trigger signal to trigger the control unit to control the LED module to not work accordingly.

13. The short-circuit protection circuit of claim 12, wherein the LED module further comprises a number of LED strings connected between the positive input port and ground in parallel, each LED string comprises several light-emitting diodes (LEDs) and a first N-channel metal oxide semiconductor field effect transistor (NMOS FET) which are connected in series; the LEDs are connected between the positive input port and a drain of the NMOS FET, a source of the first NMOS FET is grounded, a gate of the NMOS FET constitutes the controlled port.

14. The short-circuit protection circuit of claim 13, wherein the feedback module comprises a first resistor and a second resistor which are connected between the positive input port and ground in series; a connection node of the first resistor and the second resistor constitutes a feedback terminal; the voltage of the positive input port is divided by the first resistor and the second resistor and forms a voltage of the feedback terminal, the voltage of the feedback terminal is the detection voltage produced by the feedback detection module.

15. The short-circuit protection circuit of claim 14, wherein the comparison module comprises an operational amplifier, the operational amplifier comprises an non-inverting input port, an inverting input port, and an output port, the non-inverting input port is connected to the reference voltage, the inverting input port is connected to the feedback terminal of the feedback module; the trigger module comprises a third resistor, a fourth resistor, and a second NMOS FET, the third resistor and the fourth resistor are connected between a voltage port and ground in series; a connection node of the third resistor and the fourth resistor is connected to a drain of the second NMOS FET and the trigger port of the control unit, a source of the second NMOS FET is grounded, a gate of the second NMOS FET is connected to the output port of the operational amplifier.

16. The short-circuit protection circuit of claim 13, wherein each LED string of the LED module further comprises a fifth resistor connected between the first NMOS FET and the ground; the control unit further comprises a plurality of signal pins, ends of the fifth resistors of these LED strings far away from the ground are connected to the signal pins one by one; the signal pins are configured to detect current flowing though the LED strings.

17. The short-circuit protection circuit of claim 13, wherein the control unit further comprises a feedback pin connected to the feedback terminal of the feedback module and a gate pin, the short-circuit protection circuit further comprises a third NMOS FET, a drain of the third NMOS FET is electrically connected to the voltage port, a source of the third NMOS FET is grounded via a sixth resistor, a gate of the third NMOS FET connected to the gate pin; the control unit is further configured to output a pulse width modulation (PWM) signal to control the third NMOS FET to turn on or off via the gate pin, and then convert the voltage output by the output port of the power source to a switching power source signal to power the LED module; wherein the control unit adjusts a duty cycle of the PWM signal output by the gate pin according to the feedback voltage received by the feedback pin, thus changing the switching power source signal output to the LED module.

* * * * *